(12) United States Patent
Monk et al.

(10) Patent No.: US 7,751,385 B2
(45) Date of Patent: Jul. 6, 2010

(54) SYSTEMS AND METHODS FOR COLLECTING AND DISBURSING PARTICIPANT IDENTIFYING DATA

(75) Inventors: John M. Monk, Monument, CO (US); Timothy M. Bennett, Colorado Springs, CO (US); Scott A. Blomquist, Colorado Springs, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1713 days.

(21) Appl. No.: 10/926,318

(22) Filed: Aug. 25, 2004

(65) Prior Publication Data

US 2006/0077954 A1 Apr. 13, 2006

(51) Int. Cl.
*H04L 12/66* (2006.01)
(52) U.S. Cl. ............... 370/352; 358/1.13; 370/235; 379/142.01; 379/207.02; 379/211.02; 379/219; 455/456.6; 709/220
(58) Field of Classification Search ......... 370/352–357, 370/395.52, 235; 358/1.13; 379/142.01, 379/207.02, 211.02, 219; 455/456.6; 709/220
See application file for complete search history.

(56) References Cited

U.S. PATENT DOCUMENTS

| | | | | |
|---|---|---|---|---|
| 5,557,748 | A * | 9/1996 | Norris ..................... | 709/220 |
| 6,282,279 | B1 * | 8/2001 | Ricciardi ................. | 379/219 |
| 6,567,399 | B1 * | 5/2003 | Schuster et al. .......... | 370/352 |
| 6,788,766 | B2 * | 9/2004 | Logan ..................... | 379/67.1 |
| 6,862,277 | B2 * | 3/2005 | Pan et al. ................ | 370/352 |
| 6,934,279 | B1 * | 8/2005 | Sollee et al. ............. | 370/352 |
| 7,167,468 | B2 * | 1/2007 | Donovan .................. | 370/352 |
| 7,382,869 | B2 * | 6/2008 | Smith ..................... | 379/207.02 |
| 7,460,658 | B2 * | 12/2008 | Watts et al. ............. | 379/211.02 |
| 7,499,536 | B2 * | 3/2009 | Boeckman et al. ...... | 379/210.01 |
| 7,551,922 | B2 * | 6/2009 | Roskowski et al. ...... | 455/423 |
| 7,561,520 | B2 * | 7/2009 | Holloway et al. ........ | 370/235 |
| 7,580,405 | B2 * | 8/2009 | Laliberte ................. | 370/389 |
| 2002/0009184 | A1 * | 1/2002 | Shnier .................... | 379/142.01 |
| 2002/0159442 | A1 * | 10/2002 | Quigley et al. .......... | 370/352 |
| 2002/0186685 | A1 | 12/2002 | O'brien, Jr. et al. | |
| 2003/0031165 | A1 | 2/2003 | O'Brien, Jr. | |
| 2003/0133450 | A1 * | 7/2003 | Baum ...................... | 370/389 |
| 2004/0021889 | A1 * | 2/2004 | McAfee et al. ........... | 358/1.13 |
| 2004/0037267 | A1 * | 2/2004 | Bennett et al. .......... | 370/352 |

(Continued)

FOREIGN PATENT DOCUMENTS

DE 10121496 11/2002

(Continued)

OTHER PUBLICATIONS

Handley, M. et al. "SDP: Session Description Protocol." © The Internet Society 1998. Retrieved from www.ietf.org/rfc/rfc2327.txt on Jul. 23, 2004.

(Continued)

*Primary Examiner*—Gerald Gauthier
(74) *Attorney, Agent, or Firm*—Matthew A. Pequignot; Pequignot + Myers LLC

(57) ABSTRACT

Methods and systems for assigning participant identifying data to network transmission events. Participant identifying data and identifying data related to a network transmission event are provided to a predetermined (also referred to as central) monitoring location and stored in a database at the central monitoring location.

20 Claims, 9 Drawing Sheets

U.S. PATENT DOCUMENTS

| | | | |
|---|---|---|---|
| 2004/0066753 | A1 | 4/2004 | Grovenburg |
| 2004/0127231 | A1* | 7/2004 | Dor et al. .................. 455/456.6 |
| 2005/0031114 | A1* | 2/2005 | Boeckman et al. ..... 379/220.01 |
| 2005/0201362 | A1* | 9/2005 | Klein et al. .................. 370/352 |
| 2005/0272448 | A1* | 12/2005 | Tran et al. ................. 455/456.6 |
| 2006/0044407 | A1* | 3/2006 | Barbeau .................. 348/211.3 |

FOREIGN PATENT DOCUMENTS

| | | |
|---|---|---|
| JP | 10137768 | 5/1989 |
| JP | 2004032265 A | 1/2004 |
| JP | 2005094646 | 4/2005 |

OTHER PUBLICATIONS

Rosenberg, J. et al. "SIP: Session Initiation Protocol." © the Internet Society 2002. Retrieved from www.ietf.org/rfc/rfc3261.txt on Aug. 17, 2004.

Schulzrinne, H. et al. "RTP: A Transport Protocol for Real-Time Applications." © The Internet Society 2003. Retrieved from www.ietf.org/rfc/rfc3550.txt on Aug. 17, 2004.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   RC    |   PT=SR=200   |             length            | header
+-+-+-+-+-+-+-+-+-+-+-+-+-+-+-+-+-+-+-+-+-+-+-+-+-+-+-+-+-+-+-+-+
|                         SSRC of sender                        |
+=+=+=+=+=+=+=+=+=+=+=+=+=+=+=+=+=+=+=+=+=+=+=+=+=+=+=+=+=+=+=+=+
|              NTP timestamp, most significant word             | sender
+-+-+-+-+-+-+-+-+-+-+-+-+-+-+-+-+-+-+-+-+-+-+-+-+-+-+-+-+-+-+-+-+ info
|             NTP timestamp, least significant word             |
+-+-+-+-+-+-+-+-+-+-+-+-+-+-+-+-+-+-+-+-+-+-+-+-+-+-+-+-+-+-+-+-+
|                         RTP timestamp                         |
+-+-+-+-+-+-+-+-+-+-+-+-+-+-+-+-+-+-+-+-+-+-+-+-+-+-+-+-+-+-+-+-+
|                     sender's packet count                     |
+-+-+-+-+-+-+-+-+-+-+-+-+-+-+-+-+-+-+-+-+-+-+-+-+-+-+-+-+-+-+-+-+
|                      sender's octet count                     |
+=+=+=+=+=+=+=+=+=+=+=+=+=+=+=+=+=+=+=+=+=+=+=+=+=+=+=+=+=+=+=+=+
|                 SSRC_1 (SSRC of first source)                 | report
+-+-+-+-+-+-+-+-+-+-+-+-+-+-+-+-+-+-+-+-+-+-+-+-+-+-+-+-+-+-+-+-+ block
| fraction lost |       cumulative number of packets lost       | 1
+-+-+-+-+-+-+-+-+-+-+-+-+-+-+-+-+-+-+-+-+-+-+-+-+-+-+-+-+-+-+-+-+
|             extended highest sequence number received         |
+-+-+-+-+-+-+-+-+-+-+-+-+-+-+-+-+-+-+-+-+-+-+-+-+-+-+-+-+-+-+-+-+
|                        interarrival jitter                    |
+-+-+-+-+-+-+-+-+-+-+-+-+-+-+-+-+-+-+-+-+-+-+-+-+-+-+-+-+-+-+-+-+
|                           last SR (LSR)                       |
+-+-+-+-+-+-+-+-+-+-+-+-+-+-+-+-+-+-+-+-+-+-+-+-+-+-+-+-+-+-+-+-+
|                      delay since last SR (DLSR)               |
+=+=+=+=+=+=+=+=+=+=+=+=+=+=+=+=+=+=+=+=+=+=+=+=+=+=+=+=+=+=+=+=+
|                 SSRC_2 (SSRC of second source)                | report
+-+-+-+-+-+-+-+-+-+-+-+-+-+-+-+-+-+-+-+-+-+-+-+-+-+-+-+-+-+-+-+-+ block
:                              ...                              : 2
+=+=+=+=+=+=+=+=+=+=+=+=+=+=+=+=+=+=+=+=+=+=+=+=+=+=+=+=+=+=+=+=+
|                   profile-specific extensions                 |
+-+-+-+-+-+-+-+-+-+-+-+-+-+-+-+-+-+-+-+-+-+-+-+-+-+-+-+-+-+-+-+-+
```

SYSTEMS AND METHODS FOR COLLECTING AND DISBURSING PARTICIPANT IDENTIFYING DATA

BACKGROUND OF THE INVENTION

This invention relates generally to monitoring network transmission.

The needs for collecting from and disbursing participant identifying data to network locations can be best described by reference to the following particular application.

Worldwide deregulation and packet-switched technology have brought dramatic changes to the telecommunications industry. Voice communication over packet-switched networks, such as, the Internet, is now in demand. Voice Over the Internet technology is now available which integrates a public switched telephone network (PSTN) and the Internet. Voice over the Internet technology is also referred to as, Voice over Internet Protocol (VoIP), Voice over IP (VoIP) uses the Internet Protocol (IP) to transmit voice as packets over a network using the Internet Protocol. So VoIP can be achieved on any data network that uses the Internet Protocol, like Internet, Intranets and Local Area Networks (LAN).

In most VoIP system, the VoIP gateways comprise two separate gateways: the signaling gateway and the media gateway. In a VoIP phone call, after a number is dialed, the number is mapped to an IP host using signaling protocols. Then, signaling protocols are utilized for establishing the media sessions (voice, video, etc.) These protocols contain phone number information. After the media session is established, the VoIP data communication utilizes the Real-Time Transport Protocol/User Datagram Protocol/Internet Protocol (RTP/UDP/IP) as the protocol stack.

Monitoring the RTP media transmission does not ensure obtaining the phone number originating or receiving the RTP media transmission since the signaling and the media information may travel over different segments of the network.

Therefore, there is a need for providing means for assigning phone numbers (participant identifying data) to RTP (network) transmission events.

BRIEF SUMMARY OF THE INVENTION

The needs for the invention set forth above as well as further and other needs and advantages of the present invention are achieved by the embodiments of the invention described hereinbelow.

Methods and systems for assigning participant identifying data to network transmission events are disclosed.

The method of this invention includes monitoring a network transmission event substantially at a participant location, and obtaining, substantially at the participant location, participant identifying data and identifying data related to the network transmission event. The participant identifying data and the identifying data related to the network transmission event is then provided to a predetermined (also referred to as central) monitoring location and stored in a database. From another location in the network, identifying data related to another network transmission event is provided to the central monitoring location for querying the specific participant identifying data. If the query results in obtaining the specific participant identifying data, the specific participant identifying data is provided, from the central monitoring location, to the another network location.

The specific participant identifying data is thereby assigned to the another network transmission event.

In one embodiment, the participant identifying data is obtained from a signaling transmission event.

Systems that implement the methods and computer program products that have computer readable code, which executes the method, embodied therein are also disclosed.

For a better understanding of the present invention, together with other and further needs thereof, reference is made to the accompanying drawings and detailed description and its scope will be pointed out in the appended claims.

BRIEF DESCRIPTION OF THE SEVERAL VIEWS OF THE DRAWING

FIG. 9 is schematic representation of a conventional RTCP datagram.

DETAILED DESCRIPTION OF THE INVENTION

Methods and systems for assigning participant identifying data to network transmission events are disclosed herein below.

Figure 1:
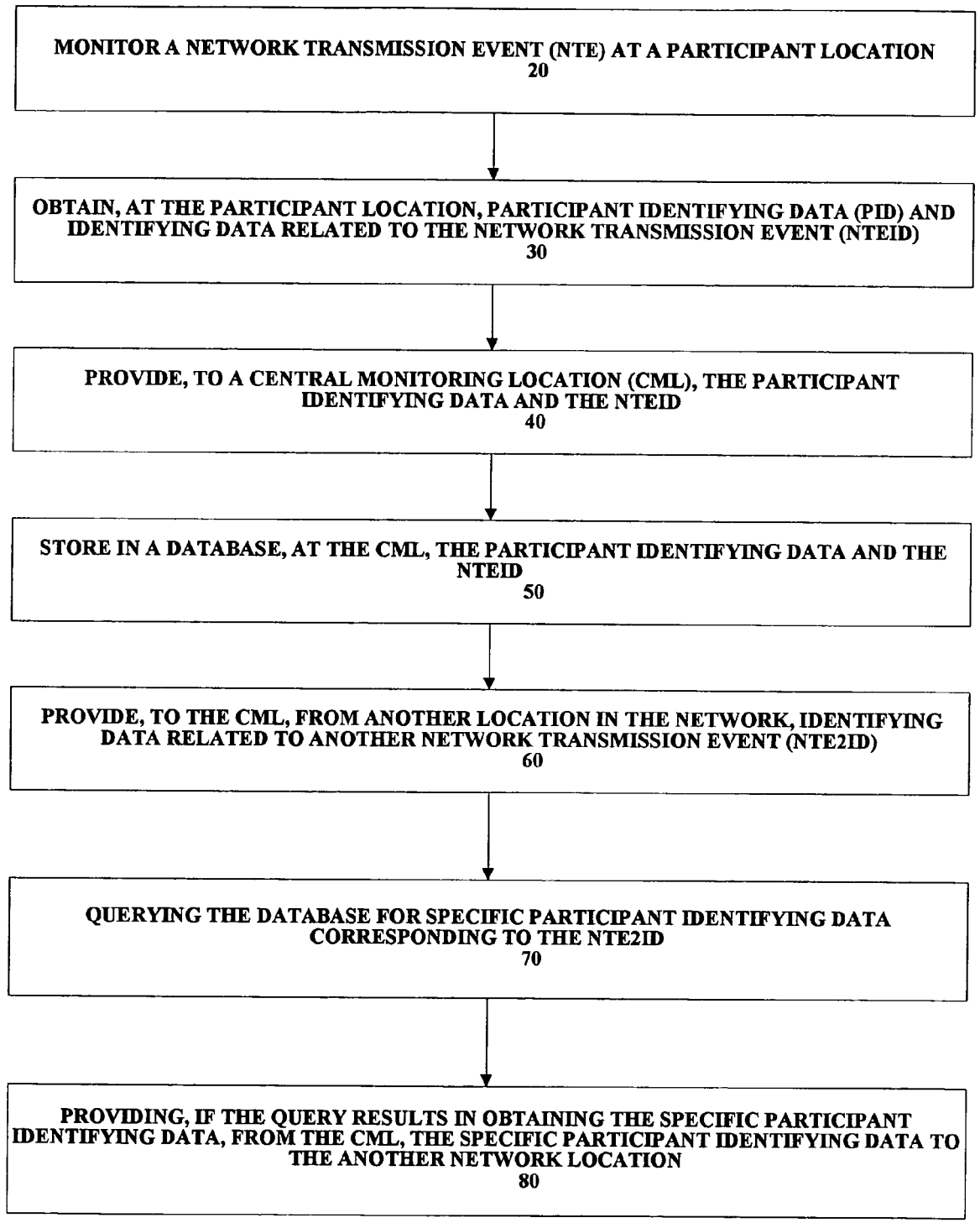
FIG. 1 is a schematic flow diagram representation of an embodiment of the method of this invention.

A flow diagram representation of an embodiment 10 of the method of this invention is shown in FIG. 1. Referring to FIG. 1, a network transmission event is monitored substantially at a participant location (step 20, FIG. 1), and participant identifying data and identifying data related to the network transmission event is obtained (step 30, FIG. 1). The participant identifying data and the identifying data related to the network transmission event are then provided to a predetermined (also referred to as central) monitoring location (step 40, FIG. 1) and stored in a database at the central monitoring location (step 50, FIG. 1). (A database, as used herein, is any collection of information that is organized so that it can easily be accessed, managed, and updated.) Identifying data related to another network transmission event is provided to the central monitoring location from another location in the network (step 60, FIG. 1), where the identifying data related to another network transmission event is obtained at the another location in the network and the database is queried for specific participant identifying data corresponding to the identifying data related to the another network transmission event (step 70, FIG. 1). If the query results in obtaining the specific participant identifying data, the specific participant identifying data is provided, from the central monitoring location, to the network monitoring device located at substantially the another location in the network (step 80, FIG. 1). The specific participant identifying data is thereby assigned to the another network transmission event.

In one embodiment, in step 30 of FIG. 1, the participant identifying data is obtained from a signaling transmission event. In some embodiments, the identifying data relating to another network transmission event is then obtained from a real time transport event. When, in some embodiments, the signaling transmission event is a transmission utilizing an Internet Protocol, the signaling transmission event utilizes a signaling protocol such as, but not limited to, H.323, SIP, MGCP, or Megaco/H.248.

Figure 2:
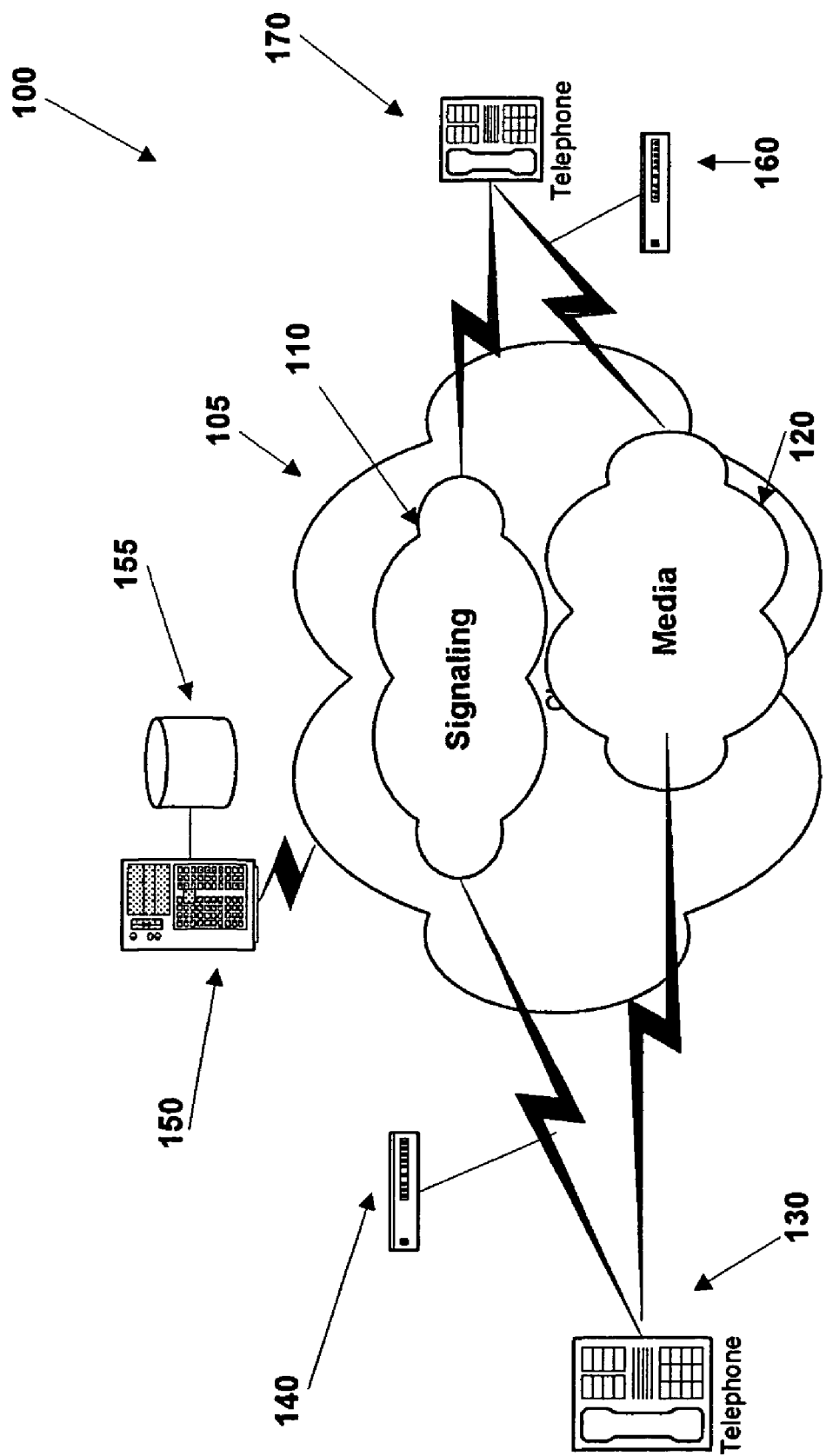
FIG. 2 is graphical schematic representation of an embodiment of the system of this invention.
Figure 3:
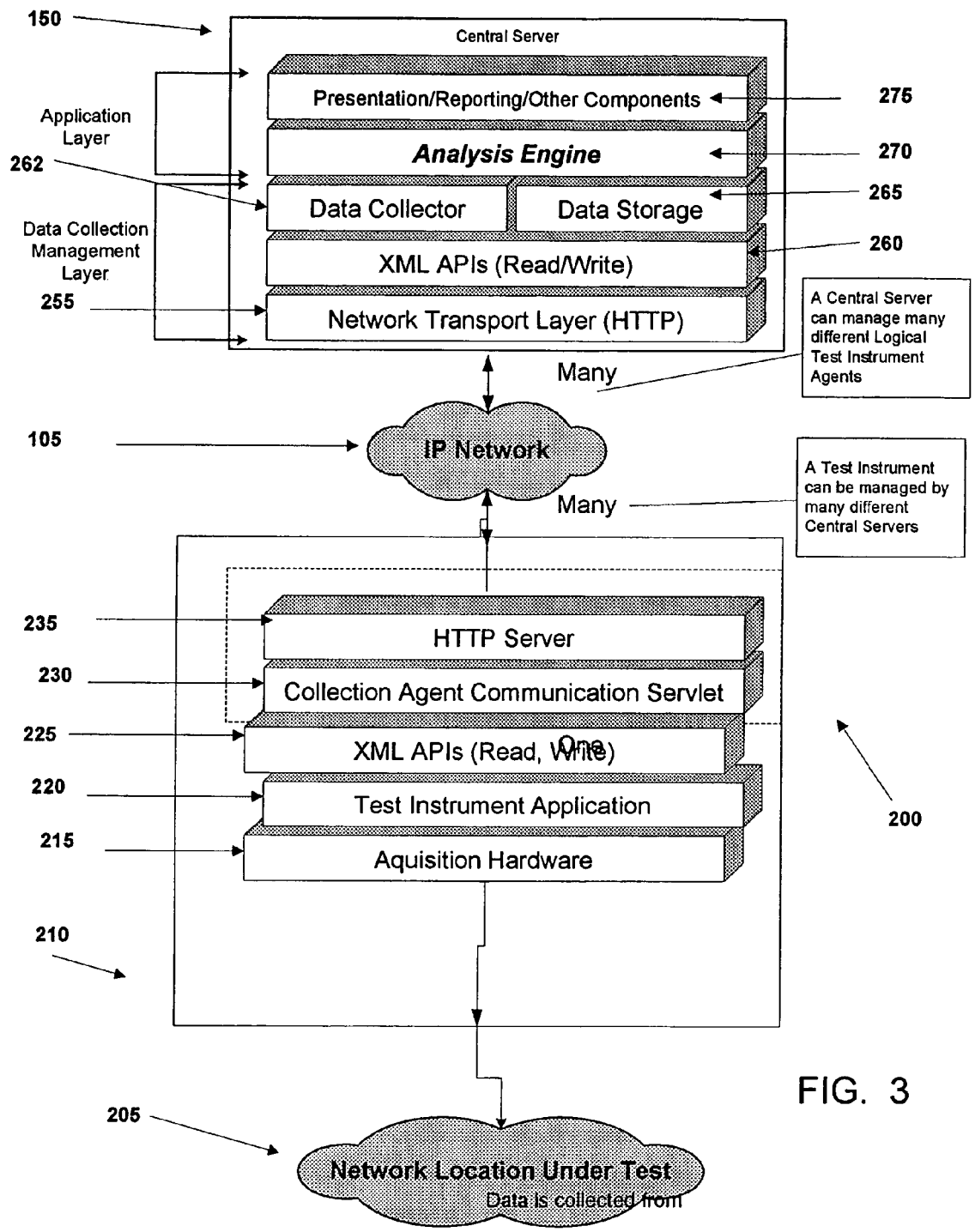
FIG. 3 is another schematic representation of an embodiment of the system of this invention.

A graphical representation of an embodiment 100 of the system of this invention is shown in FIG. 2 and another schematic representation of an embodiment 200 of the system of this invention is shown in FIG. 3. Referring to FIGS. 2 and 3, the embodiment 100 of the system of this invention shown in FIG. 2 includes a network monitoring subsystem 140 capable of monitoring a network transmission event occurring substantially at a participant location 130, a central monitoring subsystem (server) 150, and another network monitoring device 160, at another network locations 170. In one embodiment, both the network monitoring subsystems 140, 160 and the central monitoring subsystem (server) 150 are based on an implementation such as, but not limited to, that shown in FIG. 4, where the subsystem includes a network interface component 320, one or more processors 310, one or more computer readable memories 360, and at least one other computer readable memory 340. The network interface component 320, the one or more processors 310, the one or more computer readable memories 360, and the one or more computer readable memories 340 are operably connected by means of a interconnection means 325 (such as, but not limited to, a common "bus").

In the embodiment shown in FIG. 2, network transmission and communication with the central monitoring subsystem (server) 150 occur through a network 105; but, signaling transmission events travel on one segment of the network while the media travel on a different segment. The two segments are shown in FIG. 2 as two sub-networks 110, 120.

The schematic representation shown in FIG. 3 depicts the embodiment 200 of the system of this invention utilizing a layer representation (similar to that used to depict protocols). Referring to FIG. 3, a network monitoring subsystem 140 acquires the data from a network transmission event occurring substantially at a participant location 130 in FIG. 2 by means of the acquisition hardware 215 (the acquisition hardware can be similar, but is not limited to, to that found in network analyzers such as the "J6800A Network Analyzer" of AGILENT TECHNOLOGIES, Inc.). The data is analyzed by means of a test instrument application code 220. The test instrument application code 220 provides the means for means for obtaining, substantially at the participant location 130, participant identifying data and identifying data related to the network transmission event. In one embodiment, the signaling messages include the participant identifying data and identifying data related to the network transmission event. The test instrument application code 220 extracts the participant identifying data and identifying data related to the network transmission event from the signaling messages. In the embodiment shown in FIG. 3, software used for communicating with the central monitoring subsystem 150 (the XML APIs 225, the communication servlet 230 and the HTTP server 235 provide the software (code) in the embodiment shown) in conjunction with the processor 310 and the network interface 320 constitute the means for providing, to the central monitoring subsystem 150, the participant identifying data and the identifying data related to the network transmission event.

At the central monitoring subsystem 150, the participant identifying data and the identifying data related to the network transmission event are received and stored by means of the software used for communicating (such as, in the embodiment shown, the HTTP layer 255, the XML APIs 260) and software for data collection 262 and for data storage 265. The participant identifying data and the identifying data related to the network transmission event are stored in the database 155. The database 155 is located one or more computer readable memories, such as memory 340 in FIG. 4, which has a data structure stored therein, the data structure including information resident in the database. The data structure comprises one or more data object pairs stored in the one or more computer readable memories, the one or more data object pairs comprising a predetermined participant identifying data object and an identifying data related to a predetermined network transmission event.

At another network location 170, another network transmission event is monitored by means of acquisition hardware 215 and test instrument application code (software) 220. The data is analyzed by means of a test instrument application code 220. The test instrument application code 220 provides the means for obtaining identifying data related to the another network transmission event. In the embodiment shown in FIG. 3, software used for communicating with the central monitoring subsystem 150 (the XML APIs 225, the communication servlet 230 and the HTTP server 235 provide the software (code) in the embodiment shown) in conjunction with the processor 310 and the network interface 320 constitute the means for providing, to the central monitoring subsystem 150, the identifying data related to the another network transmission event.

Figure 4:
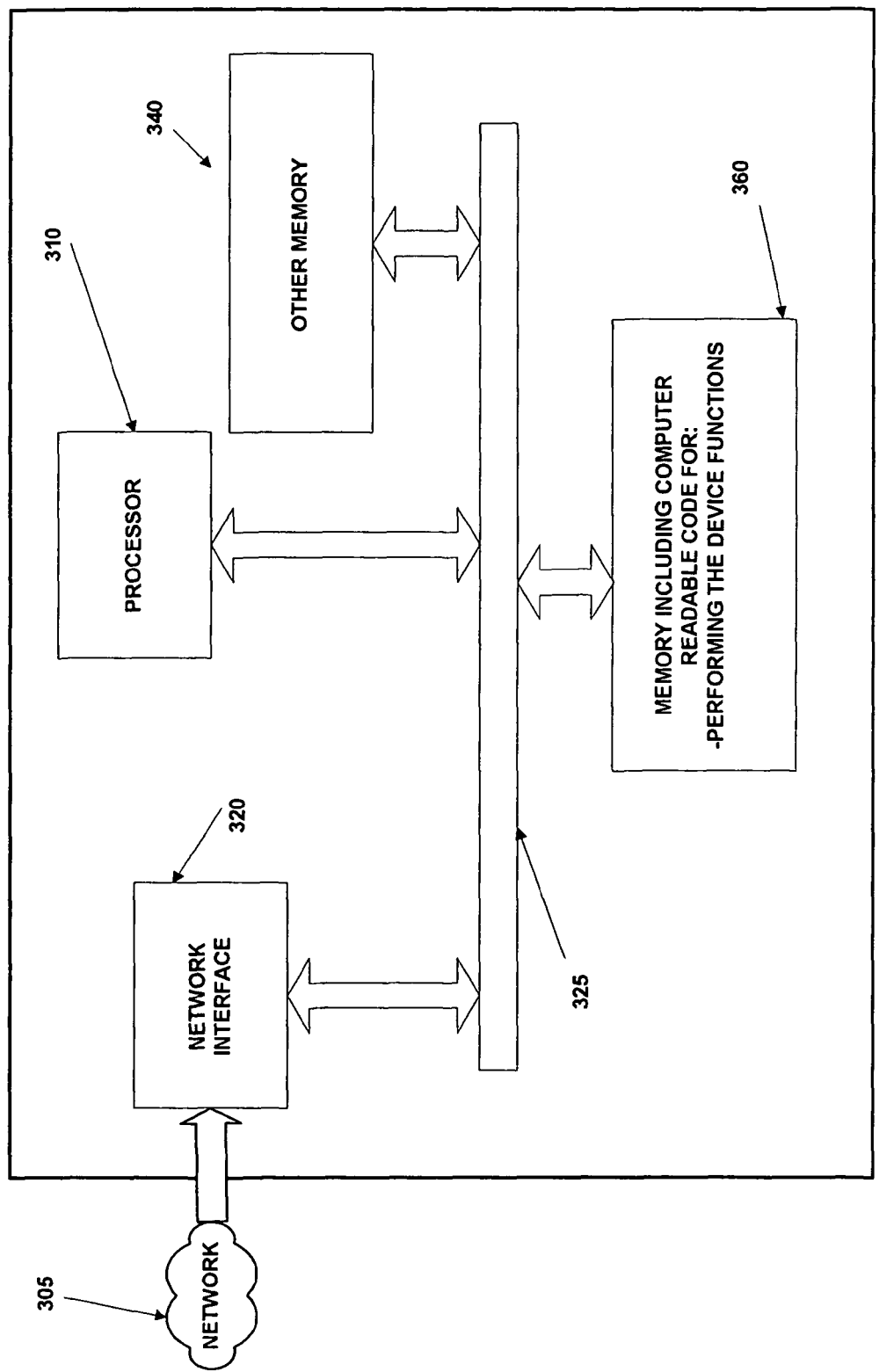
FIG. 4 is schematic block diagram representation of an embodiment of the components of the system of this invention.

At the central monitoring subsystem 150, computer readable code (software) embodied in one or more computer usable memories, such as memory 360 in FIG. 4, causes one or more processors at the central monitoring subsystem 150 to query the database 155 for specific participant identifying data corresponding to the identifying data related to the another network transmission event. If the query results in obtaining the specific participant identifying data, the software used for communicating (such as, in the embodiment shown, the HTTP layer 255, the XML APIs 260), software for data retrieval, in conjunction with the one or more processors and the network interface at the central monitoring subsystem 150 (such as processor 310 and the network interface 320 in FIG. 4) constitute the means for means for providing, to the another network monitoring subsystem 160, the specific participant identifying data.

The one or more computer readable memories, such as one or more computer readable memories 360 in FIG. 4, in each of the network monitoring devices 140, 160 and in the central monitoring subsystem 150 has readable code embodied therein, the computer readable code capable of causing at least one processor in each of the network monitoring devices and in the central monitoring subsystem 150 to monitor a network transmission event substantially at a participant location, obtain, substantially at the participant location 130, participant identifying data and identifying data related to the network transmission event, provide, to the central monitoring location (subsystem) 150, the participant identifying data and the identifying data related to the network transmission event, store in the database 155, at the central monitoring location (subsystem) 150, the participant identifying data and the identifying data related to the network transmission event, provide, to the central monitoring location (subsystem) 150, from another location 170 in the network, identifying data related to another network transmission event, the identifying data related to another network transmission event being obtained at the another location in the network, query the database 155 for specific participant identifying data corresponding to the identifying data related to the another network transmission event, and, provide, if the query results in obtaining the specific participant identifying data, from the central monitoring location 150, the specific participant identifying data to the another network monitoring device 160.

In order to even more clearly understand the present invention, reference is now made to the following illustrative embodiment. Referring again to FIG. 2, a calling telephone 130 (i.e., source) initiates a phone call to a receiving telephone 170 (i.e., receiver) over a network 105. In one embodiment, the phone call initiation occurs via signaling messages (signaling transmission events) utilizing SIP as the signaling protocol.

Figure 5:
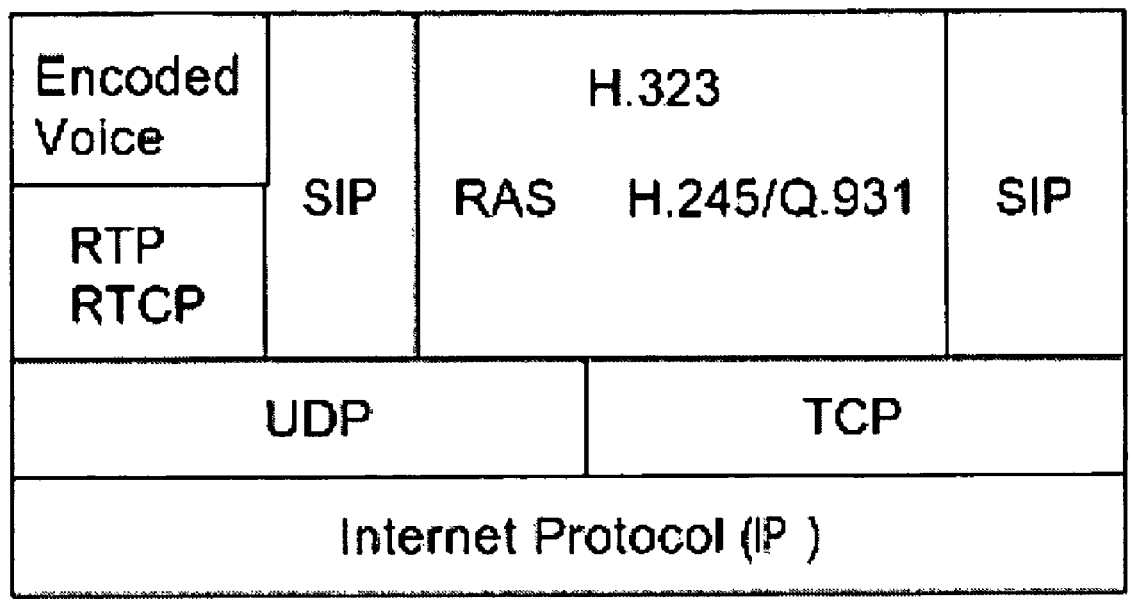
FIG. 5 is schematic representation of a conventional protocol stack.

The SIP protocol is a text-based protocol that works above the transport layer in the TCP/IP (Transport Control Protocol/Internet Protocol) stack. (SIP is defined in RFC3261, "SIP: Session Initiation Protocol", June 2002, available at http://www.ietf.org/rfc/rfc3261.txt, which is herein incorporated by reference.) SIP can use any transport protocol, including TCP (Transport Control Protocol) and UDP (User Datagram Protocol) as its transport protocol. The protocol stack is shown in FIG. 5 for both SIP and H.323 as signaling protocols.

While SIP can be utilized to convey signaling information, the session description information is conveyed by means of another protocol such as the Session Description Protocol (SDP). SDP is purely a format for session description. SDP does not incorporate a transport protocol. (SDP is defined in RFC2327, "SDP: Session Description Protocol", April 1998, available at http://www.ietf.org/rfc/rfc2327.txt, which is incorporated by reference herein.) Access to a transport protocol is obtained through use of SDP in conjunction with a protocol such as SIP.

Figure 6:
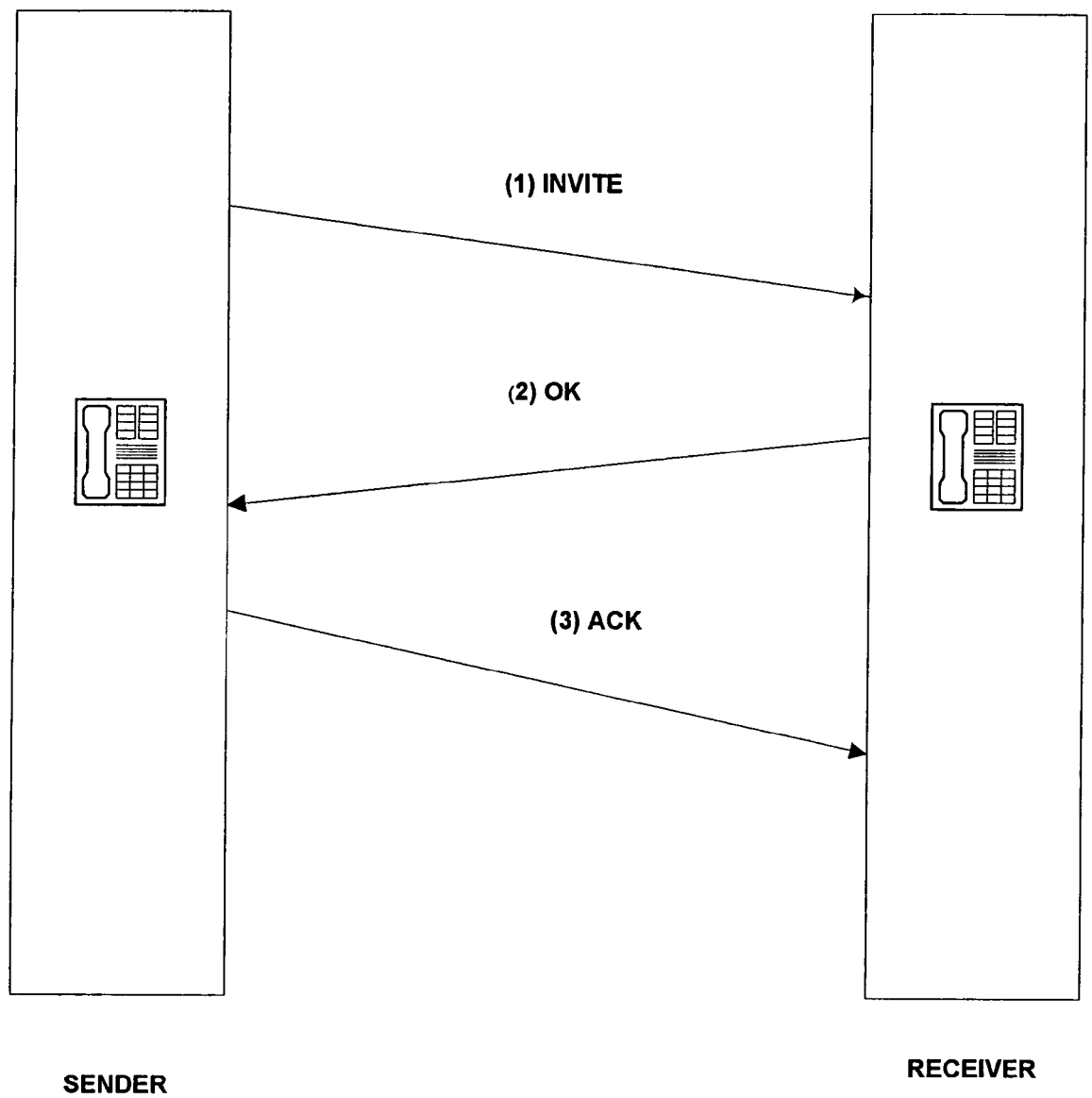
FIG. 6 is schematic representation of a conventional signaling message flow.

The steps in initiating a phone call (session) are fairly simple: as shown in FIG. 6, (1) the source sends an INVITE request to the receiver. Once the INVITE message reaches the receiver, (2) the receiver responds with an OK message. When the source receives the OK message, indicating the receiver has received the INVITE, (3) the source sends an ACK message, which, when received, will start the session. In some embodiments, a proxy server (not shown) is utilized to receive the messages from the source and receiver and forward the messages.

In this illustrative embodiment, the following is an example of the contents of an INVITE SIP message. (In this example, the source is Alice and the receiver is Bob.) The INVITE SIP message from Alice includes:

```
INVITE sip:bob@agi.com SIP/3.0
Via:   SIP/3.0/UDP 192.2.4.4:5060
From:  Alice <sip:111-1234@agi.com>
To:    Bob <sip:111-6666@agi.com>
tag=203 941 885
Call-ID: 123456789@192.2.4.4
CSeq:  1 INVITE
Contact: < sip:111-1234@agi.com>
Content -Type: application/SDP
Content-Length: 182
v= 0
o=Alice ... IP4 192.2.4.4
p=1 111 111 1234
.
m=audio 5060 RTP ...
```

The first line indicates that the message is an INVITE message. "Via" contains the IP address, the port number and the transport protocol that Alice wants Bob to use in his response. The "To" line contains Bob's name and phone number. The "From" line contains Alice's name and Alice's phone number. Call-ID contains a unique identifier for the call. Content Type describes the message content and Content Length describes the length of the message body. A blank line indicate the end of the SIP headers and the beginning of the SDP session description information—"v" identifies the version of SDP, "o" identifies the owner/creator and session identifier, "p" provides the phone number, "m" provides the media description: the type, port, and possible format the source is willing to receive and send.

The response OK message from Bob includes:

```
SIP/3.0 200 OK
Via:   SIP/3.0/UDP 192.2.4.4:5060
From:  Alice <sip:111-1234@agi.com>
To:    Bob <sip:111-6666@agi.com>
tag=203 941 885
Call-ID: 123456789@192.2.4.4
CSeq:  1 INVITE
Contact: < sip:111-1234@agi.com>
Content -Type: application/SDP
Content-Length: 198
v=0
o= Bob ... IN IP4 192.1.2.3
p=1 111 111 6666
m= audio 5004 RTP...
```

Referring again to FIG. 2, the network monitoring subsystem 140 monitors, at source location 130, the signaling transmission. By parsing the INVITE and OK messages and the corresponding session descriptions, the network monitoring subsystem 140 can obtain the source and receiver phone numbers, the network addresses and port numbers for the source and receiver (Alice and Bob). The source and receiver phone numbers, the network addresses and port numbers for the source and receiver are then provided to the central monitoring server 150 and stored in the database 155. In one embodiment, the network monitoring subsystem 140 is a network analyzer such as, but not limited to, a "J6800A Network Analyzer (hardware) and J6844A Telephony Network Analyzer (software)" from AGILENT TECHNOLOGIES, Inc.

Figure 7:
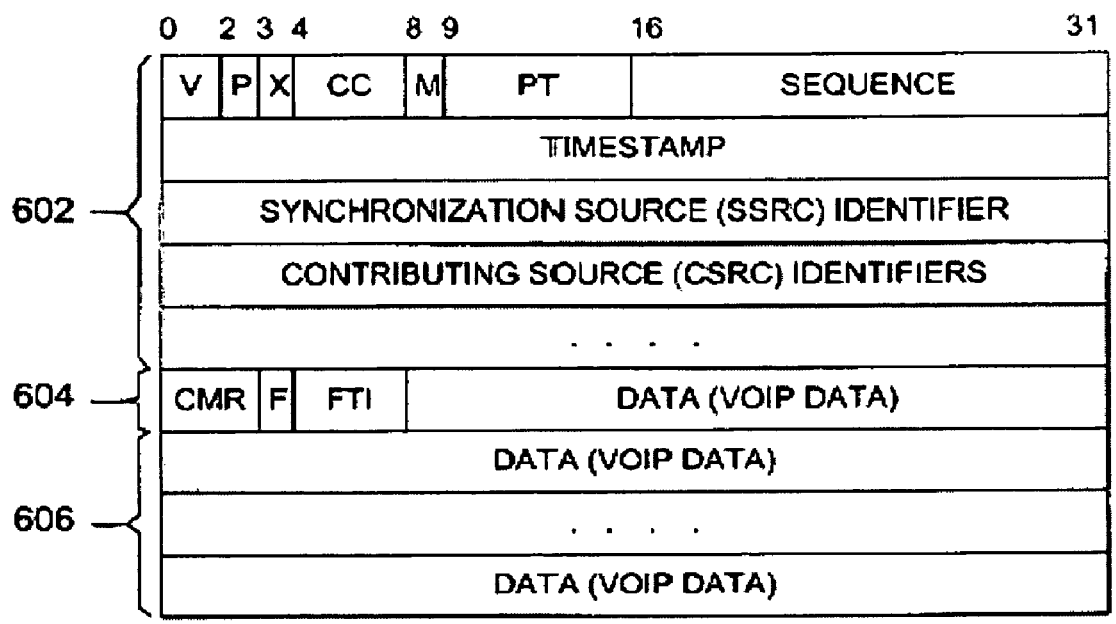
FIG. 7 is schematic representation of a conventional RTP datagram.

As specified in the signaling messages, the voice (VoIP) data communication utilizes the Real-Time Transport Protocol/User Datagram Protocol/Internet Protocol (RTP/UDP/IP) as the protocol stack. An example of an RTP datagram is shown in FIG. 7. The RTP fields include fields for a sequence number, time stamp, synchronization source identifiers, and contributing source identifiers. (RTP is defined in RFC3550, "RTP: A Transport Protocol for Real-time applications", July 2003, available at http://www.ietf.org/rfc/rfc3550.txt, which is herein incorporated by reference.)

Figure 8:
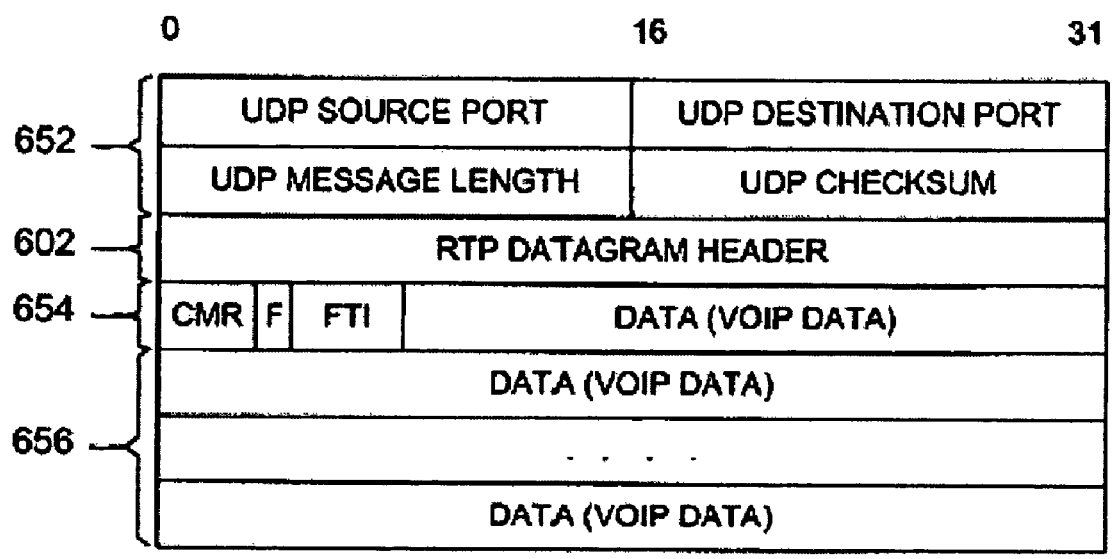
FIG. 8 is schematic representation of a conventional UDP datagram.

For the source and the receiver, an RTP session is defined by a particular pair of destination transport addresses (one network address plus a port pair for RTP and RTCP). A UDP datagram is shown in FIG. 8 illustrating the port information. The RTP data transport protocol is augmented by a control protocol (RTCP) to allow monitoring of data delivery (allowing scalability to multicast communication), and to provide some control and identification functionality. A sender report RTCP datagram is shown in FIG. 9.

Referring again to FIG. 2, the other network monitoring subsystem 160 monitors, at receiver location 170, the RTP data packets originated by the phone call (network transmission event) from the calling telephone 130 (i.e., source) to the receiving telephone 170 (i.e., receiver). In one embodiment, the other network monitoring subsystem 160 is a network analyzer such as, but not limited to, a "J6800A Network Analyzer (hardware) and J6844A Telephony Network Analyzer (software)" from AGILENT TECHNOLOGIES, Inc. From the RTP (or RTCP) packets, the other network monitoring subsystem 160 can obtain the pair of destination transport addresses (one network address plus a port pair for RTP and RTCP) defining the RTP session. The identifying data for the RTP transmission is provided to the central monitoring server (location) 150 from the location of the receiver 170. The database 155 is queried for specific phone number data corresponding to the network address and port data related to the RTP transmission event. If the query results in obtaining the specific phone number data, the specific phone number data is provided, from the central monitoring location 150, to the other network monitoring device 160. The specific phone number data is thereby assigned to the RTP transmission event.

While in the preceding example the network monitoring subsystem 140 provides the source and receiver phone numbers, the network addresses and port numbers for the source and receiver to the central monitoring server 130 (location), the location of the network monitoring subsystem that provides the participant identifying data and the identifying data related to the signaling transmission event to the central monitoring server is not a limitation of this invention. The role of the two network monitoring systems could be interchanged in another embodiment of this invention.

Although the above described example utilizes SIP as the signaling protocol, it should be noted other signaling protocols, such as, but not limited to, H.323, MGCP, or Megaco/H.248, can be utilized in practicing this invention.

If the source and receiver phone numbers, the network addresses and port numbers for the source and receiver can be obtained from a control protocol, that protocol could be utilized in practicing the invention.

It should be also noted that the central monitoring location (server) could be implemented in hardware, software or a combination thereof. An exemplary embodiment of the central monitoring location (server) is the J6782A Network Troubleshooting Center (NTC) from Agilent Technologies, Inc., a software based system. It should also be noted that this invention is not limited to that embodiment.

Furthermore, the exemplary network 105, the signaling network 110 and the media network 120 are each simplified for ease of explanation. The networks 105, 110, 120 may include more or fewer additional elements such as networks, communication links, proxies, firewalls or other security mechanisms, Internet Service Providers (ISPs), MCUs, gatekeepers, gateways, and other elements.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method for assigning participant identifying data to network transmission events, the method comprising the steps of:

monitoring a network transmission event at a participant location;

obtaining, at the participant location and in response to the monitoring, participant identifying data and identifying data related to the network transmission event;

providing, to a predetermined monitoring location, the participant identifying data and the identifying data related to the network transmission event;

storing in a database, at the predetermined monitoring location, the participant identifying data and the identifying data related to the network transmission event;

providing, to the predetermined monitoring location, from another location other than the participant location, identifying data related to another network transmission event, the identifying data related to another network transmission event being obtained at the another location;

querying the database for specific participant identifying data corresponding to the identifying data related to the another network transmission event;

providing, if the query results in obtaining the specific participant identifying data, from the predetermined monitoring location, the specific participant identifying data to a network monitoring device;

whereby the specific participant identifying data is assigned to the another network transmission event.

2. The method of claim 1 wherein the step of obtaining, at the participant location, the participant identifying data comprises the step of obtaining the participant identifying data from a signaling transmission event.

3. The method of claim 2 wherein the step of providing the identifying data relating to another network transmission event, from another location, comprises the step of obtaining the identifying data relating to another network transmission event from a real time transport event.

4. The method of claim 1 wherein the another network transmission event is a transmission utilizing an Internet Protocol, the another network transmission event is a Voice over Internet Protocol phone call, and the participant identifying data is a phone number.

5. The method of claim 2 wherein the network transmission event is a transmission utilizing an Internet Protocol, and the signaling transmission event utilizes a signaling protocol.

6. The method of claim 5 wherein the signaling protocol is Session Initiation Protocol (SIP).

7. The method of claim 4 wherein the participant is a source of the another network transmission event; wherein the network transmission event is a transmission utilizing an Internet Protocol and the step of obtaining, at the participant location, the participant identifying data comprises the step of obtaining the participant identifying data from a signaling transmission event; and wherein the signaling transmission event utilizes a signaling protocol.

8. A system for assigning participant identifying data to network transmission events, the system comprising:
- a network monitoring subsystem capable of monitoring a network transmission event occurring at a participant location, said network monitoring subsystem having processing capabilities;
- means for obtaining, at the participant location and in response to the monitoring, participant identifying data and identifying data related to the network transmission event;
- a predetermined monitoring subsystem comprising at least one processor and at least one computer readable memory, said at least one computer readable memory having a data structure stored therein, said data structure including information resident in a database;
- means for providing, to the predetermined monitoring subsystem, the participant identifying data and the identifying data related to the network transmission event;
- means for storing in the database the participant identifying data and the identifying data related to the network transmission event;
- another network monitoring subsystem capable of monitoring another network transmission event occurring at another location other than the participant location, said another network monitoring subsystem having processing capabilities;
- means for providing, to the predetermined monitoring subsystem, the identifying data related to the another network transmission event, the identifying data related to the another network transmission event being obtained at the another;
- means for querying the database for specific participant identifying data corresponding to the identifying data related to the another network transmission event;
- means for providing, if the query results in obtaining the specific participant identifying data, from the predetermined monitoring subsystem, to the another network monitoring subsystem, the specific participant identifying data.

9. The system of claim 8 wherein said data structure comprises at least one data object pair stored in said at least one computer readable memory, said at least one data object pair comprising a predetermined participant identifying data object and an identifying data related to a predetermined network transmission event.

10. The system of claim 8 wherein the network transmission event comprises a transmission utilizing an Internet Protocol and the network transmission event comprises a signaling transmission event.

11. The system of claim 10 wherein the another network transmission event comprises a transmission utilizing an Internet Protocol, the another network transmission event comprises a Voice over Internet Protocol phone call, and the participant identifying data comprises a phone number.

12. The system of claim 11 wherein the participant location is an initiator of the Voice over Internet Protocol phone call.

13. The system of claim 11 wherein the signaling transmission event utilizes a signaling protocol.

14. A computer program product comprising:
- at least one computer usable storage medium, excluding a carrier wave, having computer readable code embodied therein, the computer readable code capable of causing at least one processor to:
  - monitor a network transmission event at a participant location;
  - obtain, at the participant location and in response to the monitoring, participant identifying data and identifying data related to the network transmission event;
  - provide, to a predetermined monitoring location, the participant identifying data and the identifying data related to the network transmission event;
  - store in a database, at the predetermined monitoring location, the participant identifying data and the identifying data related to the network transmission event;
  - provide, to the predetermined monitoring location, from another location other than the participant location, identifying data related to another network transmission event, the identifying data related to another network transmission event being obtained at the another location;
  - query the database for specific participant identifying data corresponding to the identifying data related to the another network transmission event;
  - provide, if the query results in obtaining the specific participant identifying data, from the predetermined monitoring location, the specific participant identifying data to a network monitoring device.

15. The computer program product of claim 14 wherein said at least one computer usable storage medium has a data structure stored therein, said data structure including information resident in said database.

16. The computer program product of claim 15 wherein said data structure comprises at least one data object pair stored in said at least one computer usable storage medium, said at least one data object pair comprising a predetermined participant identifying data object and an identifying data related to a predetermined network transmission event.

17. The computer program product of claim 14 wherein the network transmission event comprises a transmission utilizing an Internet Protocol and the network transmission event comprises a signaling transmission event.

18. The computer program product of claim 17 wherein the another network transmission event comprises a transmission utilizing an Internet Protocol, the another network transmission event comprises a Voice over Internet Protocol phone call, and the participant identifying data comprises a phone number.

19. The computer program product of claim 18 wherein the participant location is an initiator of the Voice over Internet Protocol phone call.

20. The computer program product of claim 18 wherein the signaling transmission event utilizes a signaling protocol.

* * * * *